5498X
J. Wright.
2. Sheets Sheet 1
Railroad Switch.
Patented Jun. 11, 1829.
NO PRINTED SPECIFICATION AVAILABLE
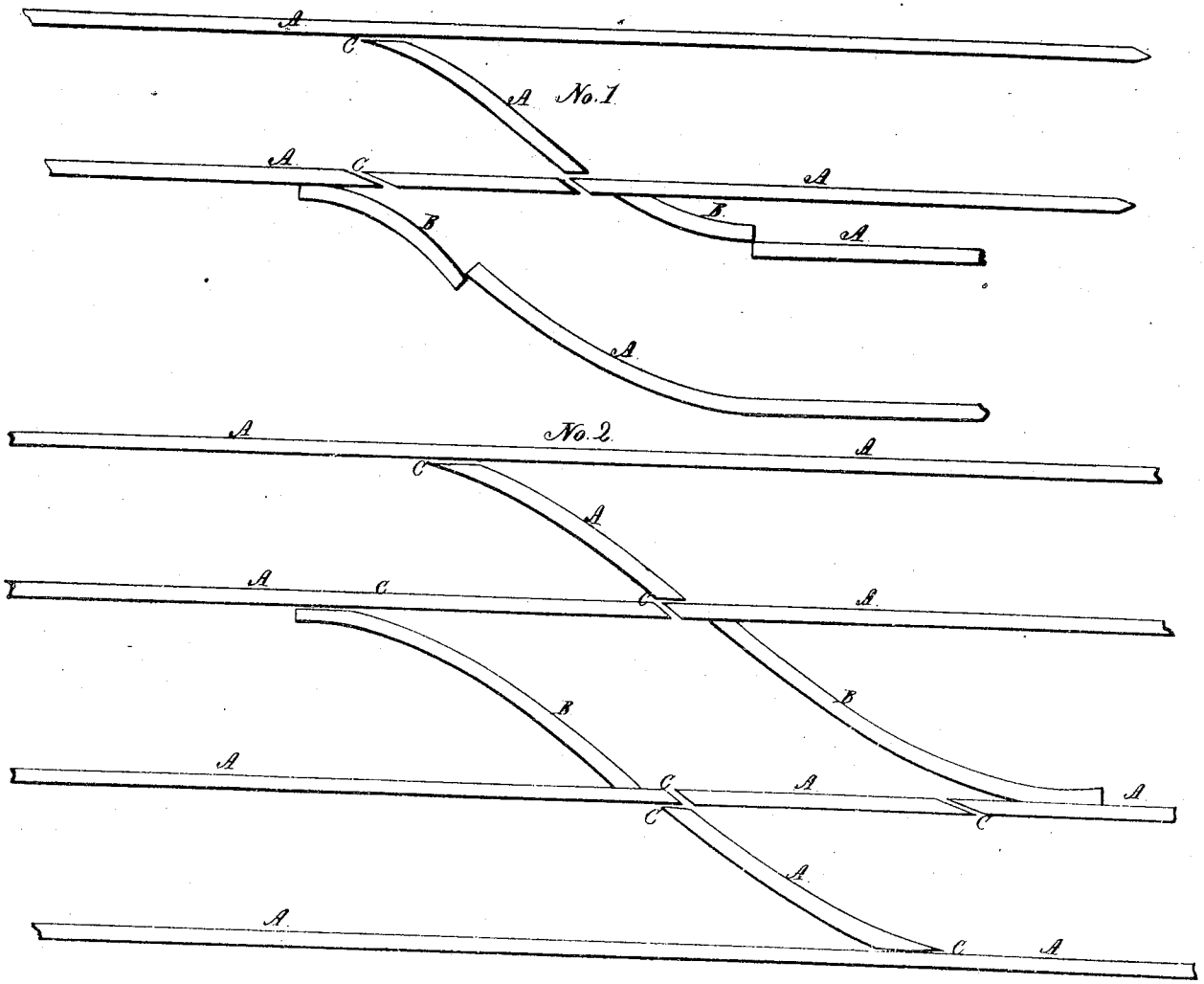

5498X
2 Sheets-Sheet 2.
J. Wright,
Railroad Switch.
Patented June 11, 1829.
NO PRINTED SPECIFICATION AVAILABLE
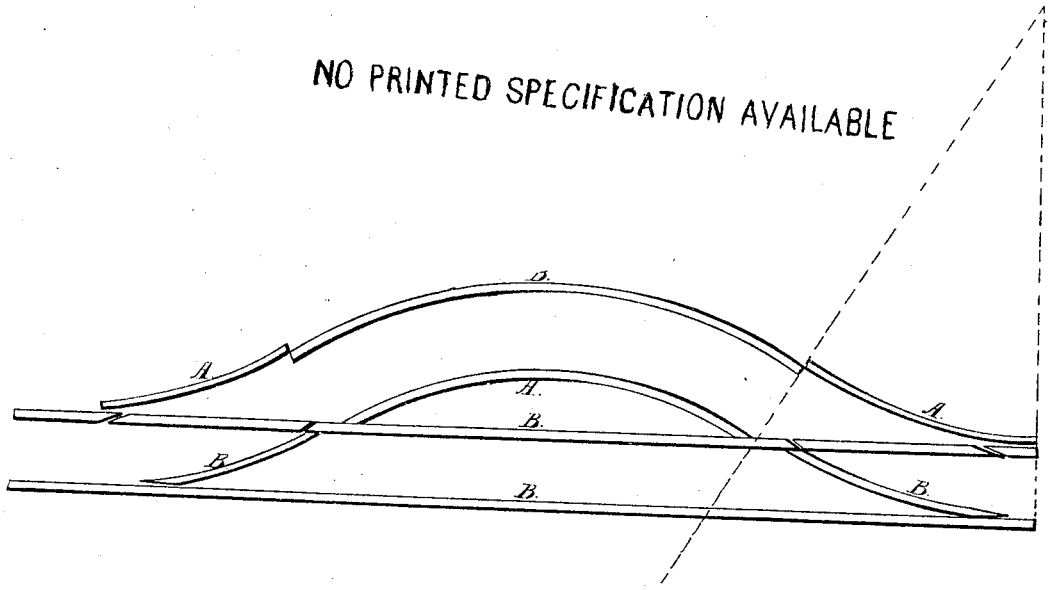
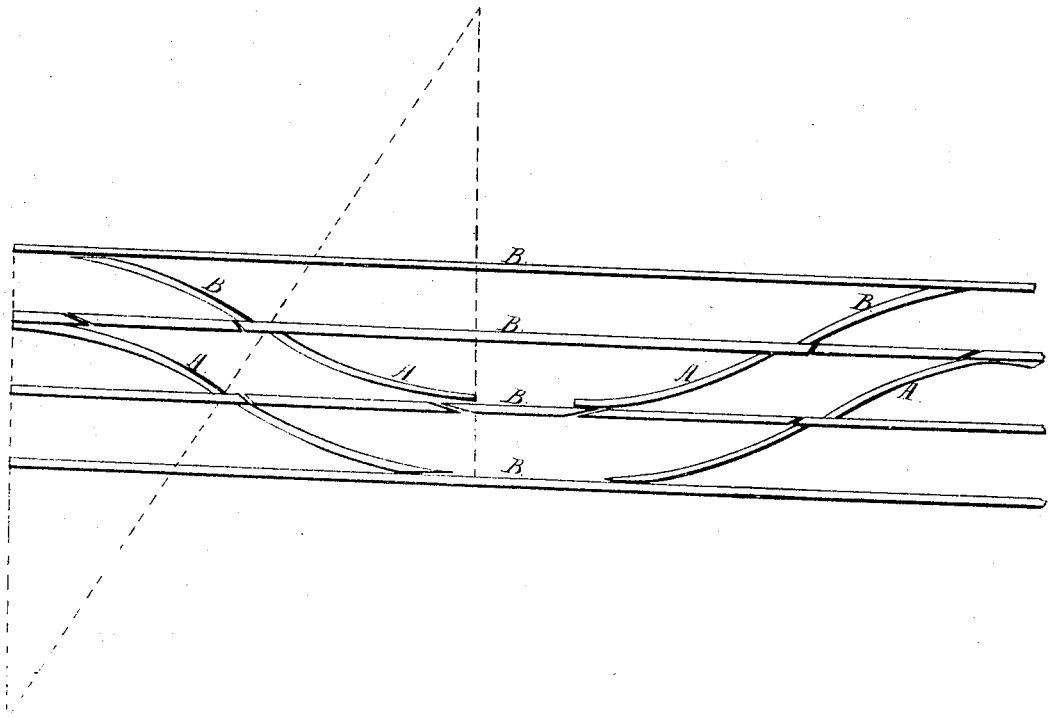

United States Patent Office

PTO - BOYERS, PA Duty Station

MISSING PAGE TEMPORARY NOTICE

PATENT # 5498X FOR ISSUE DATE 6-11-1829

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # All Text

Data Conversion Operation

Boyers, Pa